(12) United States Patent
Zhu et al.

(10) Patent No.: US 11,160,113 B2
(45) Date of Patent: Oct. 26, 2021

(54) RANDOM ACCESS PROCEDURE FOR HANDOVER

(71) Applicant: APPLE INC., Cupertino, CA (US)

(72) Inventors: Jing Zhu, Portland, OR (US); Yi Gai, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 69 days.

(21) Appl. No.: 15/877,268

(22) Filed: Jan. 22, 2018

(65) Prior Publication Data
US 2019/0029048 A1 Jan. 24, 2019

Related U.S. Application Data

(63) Continuation of application No. 14/582,364, filed on Dec. 24, 2014, now Pat. No. 9,936,524.

(51) Int. Cl.
*H04W 74/08* (2009.01)
*H04W 36/30* (2009.01)
*H04W 36/00* (2009.01)

(52) U.S. Cl.
CPC ... *H04W 74/0833* (2013.01); *H04W 36/0022* (2013.01); *H04W 36/30* (2013.01)

(58) Field of Classification Search
CPC ............. H04W 36/0022; H04W 36/30; H04W 74/0833
See application file for complete search history.

(56) References Cited

U.S. PATENT DOCUMENTS

| 8,526,388 | B1 | 9/2013 | Kaukovuori et al. |
| 2008/0316961 | A1 | 12/2008 | Bertrand et al. |
| 2009/0046641 | A1* | 2/2009 | Wang ............... H04W 74/002 370/329 |
| 2009/0285180 | A1* | 11/2009 | Zhang ............... H04W 74/004 370/331 |

(Continued)

FOREIGN PATENT DOCUMENTS

| WO | WO 2014/161194 A1 | 10/2014 |
| WO | 2014179981 A1 | 11/2014 |

(Continued)

OTHER PUBLICATIONS

3GPP TS 36.211; "3$^{rd}$ Generation Partnership Project; Technical Specification Group Radio Access Network; Evolved Universal Terrestrial Radio Access (E-UTRA); Physical channels and modulation"; (Sep. 2014); 124 pages; V12.3.0 (Release 12).

(Continued)

*Primary Examiner* — Redentor Pasia

(57) ABSTRACT

Technology for switching from a wireless local area network (WLAN) to a wireless wide area network (WWAN) is disclosed. A multi-radio access technology (multi-RAT) user equipment (UE) can receive WLAN-specific dedicated physical random access channel (PRACH) allocation information from an evolved node B (eNB) to enable the multi-RAT UE to perform an inter-RAT WLAN-to-WWAN handover. The multi-RAT UE can initiate the inter-RAT WLAN-to-WWAN handover at the multi-RAT UE by performing random access with the eNB using the WLAN-specific dedicated PRACH allocation information.

17 Claims, 11 Drawing Sheets

(56) References Cited

U.S. PATENT DOCUMENTS

| | | | |
|---|---|---|---|
| 2010/0113051 A1* | 5/2010 | Du | H04W 74/002 455/450 |
| 2010/0254351 A1* | 10/2010 | Wang | H04W 36/0055 370/332 |
| 2011/0274040 A1 | 11/2011 | Pani et al. | |
| 2012/0099562 A1* | 4/2012 | Smadi | H04W 36/08 370/332 |
| 2013/0083753 A1 | 4/2013 | Lee et al. | |
| 2013/0242783 A1 | 9/2013 | Horn et al. | |
| 2013/0242965 A1 | 9/2013 | Horn et al. | |
| 2013/0301439 A1 | 11/2013 | Heo et al. | |
| 2014/0177446 A1 | 6/2014 | Sun et al. | |
| 2014/0204771 A1 | 7/2014 | Gao et al. | |
| 2014/0269392 A1 | 9/2014 | Sartori et al. | |
| 2014/0293959 A1 | 10/2014 | Singh et al. | |
| 2014/0328177 A1 | 11/2014 | Zhao et al. | |
| 2015/0049712 A1 | 2/2015 | Chen et al. | |
| 2015/0163704 A1 | 6/2015 | Catovic et al. | |
| 2015/0208310 A1* | 7/2015 | Taneja | H04L 63/029 370/331 |
| 2016/0029282 A1* | 1/2016 | Lee | H04W 36/0069 370/332 |
| 2016/0050604 A1* | 2/2016 | Lee | H04W 36/22 370/331 |
| 2016/0057669 A1* | 2/2016 | Hong | H04W 36/0077 370/331 |
| 2016/0066232 A1 | 3/2016 | Wang et al. | |
| 2016/0095154 A1* | 3/2016 | Palm | H04W 48/18 370/329 |
| 2016/0234854 A1* | 8/2016 | Mochizuki | H04W 72/0406 |
| 2016/0286470 A1* | 9/2016 | Lee | H04W 48/20 |

FOREIGN PATENT DOCUMENTS

| | | | |
|---|---|---|---|
| WO | WO 2014/179981 A1 | 11/2014 | |
| WO | WO-2014179981 A1 * | 11/2014 | H04W 36/305 |

OTHER PUBLICATIONS

3GPP TS 36.331, V10.11.0, Sep. 2013, 3 pages.

* cited by examiner

```
value BCCH-DL-SCH-Message ::=
 message c1 : systemInformation :
  criticalExtensions systemInformation-r8 :
   sib-TypeAndInfo
    sib2 :
     radioResourceConfigCommon
      rach-ConfigCommon
       preambleInfo
        numberOfRA-Preambles n40,
        preamblesGroupAConfig
         sizeOfRA-PreamblesGroupA n32,
         messageSizeGroupA b144,
         messagePowerOffsetGroupB dB10
       ,
       powerRampingParameters
        powerRampingStep dB2,
        preambleInitialReceivedTargetPower dBm-104
       ,
       ra-SupervisionInfo
        preambleTransMax n10,
        ra-ResponseWindowSize sf5,
        mac-ContentionResolutionTimer sf32
       ,
       maxHARQ-Msg3Tx 3
      ,
      bcch-Config
       modificationPeriodCoeff n8
      ,
      pcch-Config
       defaultPagingCycle rf64,
       nB oneT
      ,
      prach-Config
       rootSequenceIndex 30,
       prach-ConfigInfo
        prach-ConfigIndex 4,
        highSpeedFlag FALSE,
        zeroCorrelationZoneConfig 8,
        prach-FreqOffset 3
      ,
```

FIG. 3A prach-Config-WiFi-LTE
  rootSequenceIndex-WiFi-LTE 30,
  prach-ConfigInfo-WiFi-LTE
    prach-ConfigIndex-WiFi-LTE 12,
    highSpeedFlag-WiFi-LTE FALSE,
    zeroCorrelationZoneConfig-WiFi-LTE 8,
    prach-FreqOffset-WiFi-LTE 3
,
pdsch-ConfigCommon
  referenceSignalPower 11,
  p-b 1
,
pusch-ConfigCommon
  pusch-ConfigBasic
    n-SB 1,
    hoppingMode interSubFrame,
    pusch-HoppingOffset 6,
    enable64QAM FALSE
 ,
  ul-ReferenceSignalsPUSCH
    groupHoppingEnabled FALSE,
    groupAssignmentPUSCH 0,
    sequenceHoppingEnabled FALSE,
    cyclicShift 0
,
pucch-ConfigCommon
  deltaPUCCH-Shift ds2,
  nRB-CQI 1,
  nCS-AN 0,
  n1PUCCH-AN 36
 ,

FIG. 3B soundingRS-UL-ConfigCommon release : NULL,
uplinkPowerControlCommon
  p0-NominalPUSCH -100,
  alpha al1,
  p0-NominalPUCCH -100,
  deltaFList-PUCCH
    deltaF-PUCCH-Format1 deltaF0,
    deltaF-PUCCH-Format1b deltaF1,
    deltaF-PUCCH-Format2 deltaF0,
    deltaF-PUCCH-Format2a deltaF0,
    deltaF-PUCCH-Format2b deltaF0 deltaPreambleMsg3 1 ul-CyclicPrefixLength len1 ue-TimersAndConstants
 t300 ms200,
 t301 ms200,
 t310 ms500,
 n310 n10,
 t311 ms3000,
 n311 n1 freqInfo
 ul-CarrierFreq 20600,
 ul-Bandwidth n50,
 additionalSpectrumEmission 12 timeAlignmentTimerCommon sf10240

FIG. 3C

RANDOM ACCESS PROCEDURE FOR HANDOVER

RELATED APPLICATIONS

This application is a continuation of U.S. patent application Ser. No. 14/582,364 filed Dec. 24, 2014 which is hereby incorporated by reference in its entirety.

BACKGROUND

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in an uplink (UL) transmission. Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems, the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). The downlink (DL) transmission can be a communication from the node (e.g., eNodeB) to the wireless device (e.g., UE), and the uplink (UL) transmission can be a communication from the wireless device to the node.

In homogeneous networks, the node, also called a macro node, can provide basic wireless coverage to wireless devices in a cell. The cell can be the area in which the wireless devices are operable to communicate with the macro node. Heterogeneous networks (HetNets) can be used to handle the increased traffic loads on the macro nodes due to increased usage and functionality of wireless devices. HetNets can include a layer of planned high power macro nodes (or macro-eNBs) overlaid with layers of lower power nodes (small-eNBs, micro-eNBs, pico-eNBs, femto-eNBs, or home eNBs [HeNBs]) that can be deployed in a less well planned or even entirely uncoordinated manner within the coverage area (cell) of a macro node. The lower power nodes (LPNs) can generally be referred to as "low power nodes", small nodes, or small cells.

In LTE, data can be transmitted from the eNodeB to the UE via a physical downlink shared channel (PDSCH). A physical uplink control channel (PUCCH) can be used to acknowledge that data was received. Downlink and uplink channels or transmissions can use time-division duplexing (TDD) or frequency-division duplexing (FDD).

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIGS. 3A-3C illustrate physical random access channel (PRACH) configuration information in a system information block type 2 (SIB2) message for wireless local area network (WLAN) to wireless wide area network (WWAN) handover in accordance with an example;

Figure 1:
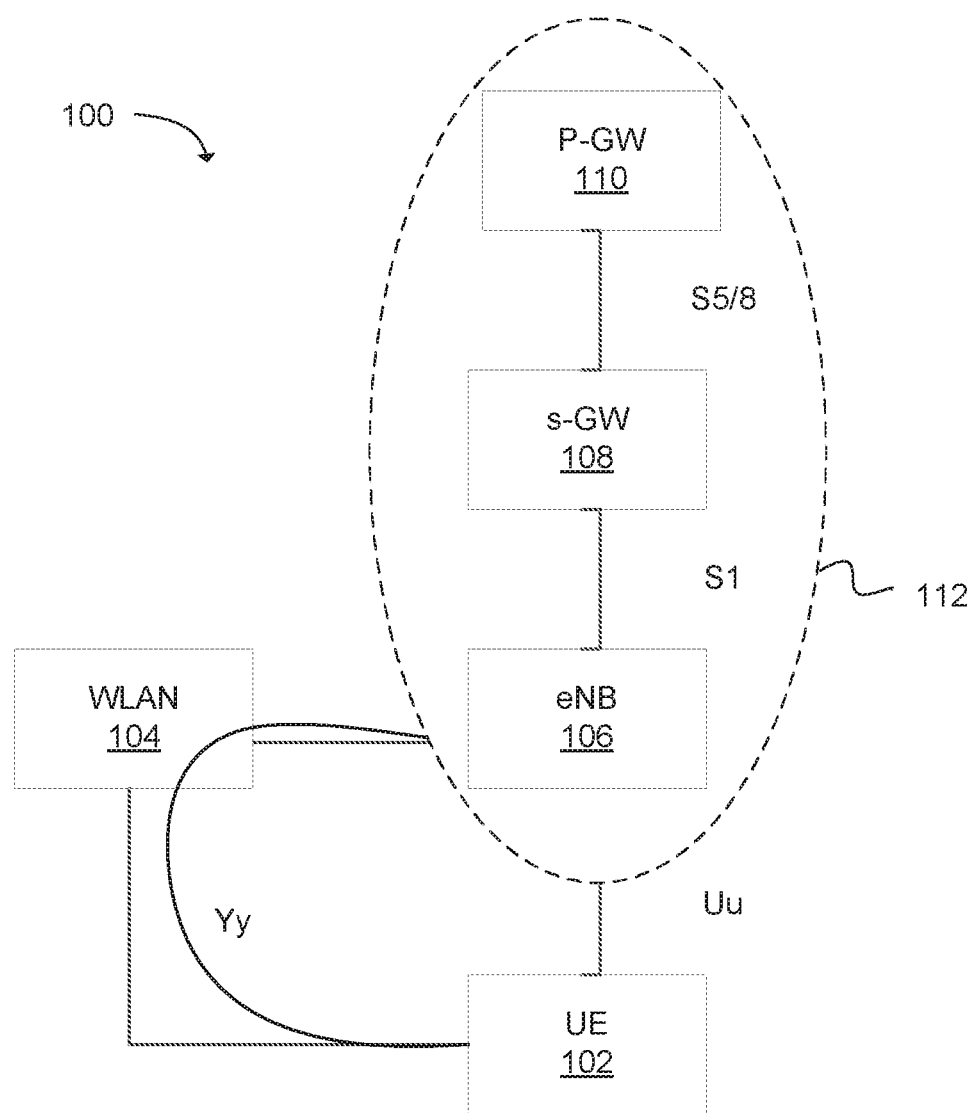
FIG. 1 illustrates an integrated radio access network (RAN)-based wireless local area network (WLAN)/wireless wide area network (WWAN) architecture in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for performing a wireless local area network (WLAN) to a wireless wide area network (WWAN) handover, or WLAN-to-WWAN handover, at a user equipment (UE). The UE can be configured to operate using multiple radio access technologies (RATs), such as WLAN (or Wi-Fi) and WWAN. The WWAN can include Third Generation Partnership Project (3GPP) Long Term Evolution (LTE) Release 8, 9, 10, 11 or 12 networks. The UE can receive physical random access channel (PRACH) configuration information from an evolved node B (eNB) that the UE can subsequently use for performing the WWAN-to-WWAN handover. Thus, the PRACH configuration information can be Wi-Fi specific PRACH configuration information. The UE can receive the PRACH configuration information when operating over the WWAN. In addition, the PRACH configuration information can be broadcasted from the eNB via a system information block type 2 (SIB2) message.

The UE can determine to switch from operating over the WWAN to operating over the WLAN, and can subsequently send a handover request message to the eNB for switching from the WWAN to the WLAN. In particular, the handover request message can be an inter-RAT handover request message. In one example, the handover request message can be included in a radio resource control (RRC) message communicated from the UE to the eNB. The eNB can reply with a handover response message (or an inter-RAT handover response message). The handover response message can be included in an RRC message communicated from the eNB to the UE. The UE can switch to the WLAN upon receiving the handover response message.

The handover response message can include a time division multiplexing (TDM)-based and/or code division multiplexing (CDM)-based dedicated PRACH allocation information. The dedicated PRACH allocation information can be WLAN-specific dedicated PRACH allocation information. The dedicated PRACH allocation information can include a PRACH preamble, a subframe index, and a frame index per cycle. In other words, the UE can be provided with dedicated subframes to subsequently perform random access when switching back to the WWAN from the WLAN. The PRACH preamble included in the dedicated PRACH allocation information can be a unique preamble for the UE or a preamble shared among a group of UEs. However, even if the preamble is shared, the UE is assigned dedicated subframes to perform the random access. In other words, the dedicated resource allocation can enable the UE to perform random access using subframes that are dedicated to the UE (i.e., non-contention based random access).

The UE can operate over the WLAN for a defined period of time. When the UE attempts to switch back to the WWAN from the WLAN, the UE can use the PRACH preamble, the subframe index, and the frame index per cycle included in the previously received dedicated PRACH allocation information to perform the random access. The UE is to perform the random access in order to switch back to the WWAN. By using the dedicated PRACH allocation information (as well as the PRACH configuration information), the UE can initiate the WLAN-to-WWAN handover by performing non-contention based random access with the eNB. Since the non-contention based random access is TDM or CDM, the UE can coordinate the random access with other UEs that are simultaneously performing random access, such that overlapping subframes are not used among the UEs. If the UE does not receive the dedicated subframes to perform the random access, the UE may attempt to perform the random access during subframes that coincide with the other UEs attempting to perform the random access to switch back to the WWAN (i.e., contention-based random access).

FIG. 1 illustrates an exemplary architecture 100 for an integrated radio access network (RAN)-based wireless local area network (WLAN)/wireless wide area network (WWAN). A user equipment (UE) 102 can be connected with both a WLAN 104 and an evolved node B (eNB) 106. The WWAN 112 can include the eNB 106, the serving gateway (S-GW) 108, and the packet data network (PDN) gateway (P-GW) 110. The architecture 100 can also be referred to as 3GPP RAN anchored WLAN. The architecture 100 can be an integrated network that has both Wi-Fi and a cellular eNB 106. In other words, the eNB 106 can also have Wi-Fi capability.

The UE 102 can be connected to the eNB 106 via a Uu interface. A Yu interface is a point-to-point (p2p) link between the UE 102 and the eNB 106 for routing the UE's traffic via the WLAN 104. For example, uplink data from the UE 102 to the eNB 106 can flow through the WLAN 104, and downlink data from the eNB 106 to the UE 102 can flow through the WLAN 104. In other words, the UE 102 can communicate with the eNB 106 using a legacy radio resource connection (RRC) link, as well as a WiFi link.

In one example, certain types of traffic between the eNB 106 and the UE 102 can flow through the WLAN 104. For example, the Yu interface can be used for user-plane operation, whereas control plane operation (e.g., WLAN discovery, handover messages) can be supported over the 3GPP RAN interface, i.e., the Uu interface between the eNB 106 and the UE 102. In addition, the eNB 106 can be connected to the S-GW 108 via an S1 interface. The S-GW 108 can be connected to the P-GW 110 via an S5/8 interface. Therefore, the integrated WLAN and WWAN network can utilize both the WLAN 104 and the WWAN 112 to efficiently provide data to the UE 102.

In one example, the WLAN 104 may suddenly experience significant interference, and a large number of UEs with traffic offloaded to the WLAN 104 may need to switch back to the WWAN 112 (e.g., LTE) simultaneously. In other words, when the UE 102 switches back to the WWAN 112, the UE 102 does not use the WLAN 104. Although the WLAN 104 provides good bandwidth, this bandwidth can be unreliable because the WLAN 104 uses an unlicensed band. As a result, the unlicensed band is subject to interference, collisions and contentions. If the WLAN 104 were to go down, all of the UEs that were previously connected to the WLAN 104 have to be simultaneously handed over back to the WWAN 112.

In previous solutions, the UEs can perform contention-based random access when switching back to the WWAN 112. Since initial access to the WWAN 112 goes through random access, all of the UEs that are connecting back to the WWAN 112 can perform the random access procedures. Since all of the UEs can attempt to perform the random access procedures at the same time, there can be significant contention (i.e., competition) on the random access channel. Contention-based random access can be inefficient and cause a relatively long WLAN-to-WWAN handover latency.

The technology described herein provides W-Fi specific physical random access channel (PRACH) configuration information to the UEs that are offloaded to the WLAN 104. The UEs can use the WiFi-specific PRACH configuration information to perform non-contention based random access during the WLAN-to-WWAN handover. Alternatively, the UEs can use the WiFi-specific PRACH configuration information to perform contention based random access during the WLAN-to-WWAN handover. Thus, a specific PRACH (e.g., dedicated channels) can be used for the UEs offloaded to the WLAN 104. As a result, when the UEs are handed over back to the WWAN 112, the UEs do not have to perform contention-based random access. In other words, the UEs are not competing with other UEs to perform the random access.

In this WLAN-specific dedicated PRACH allocation period, the UE 102 can be assigned a unique preamble and a specific time slot (i.e., subframe) to perform the random access. As a result, the UE 102 does not perform random access during a specific subframe that is also used by other UEs to perform random access. In previous solutions, the preamble can be shared among a plurality of UEs that attempt to perform the random access during coinciding subframes, which can cause contention during the random access procedure. In other words, two UEs that use the same preamble during the same time slot are subject to contention. By using the dedicated period to assign each UE different subframes and/or different time slots, non-contention based random access can be performed.

In one example, a dedicated resource block in the physical channel can be allocated only for the WiFi UEs (i.e., the UEs that connect to both the WLAN 104 and the WWAN 112). During this WLAN-specific dedicated PRACH allocation period, the UEs do not access the random access channel at the same time. In other words, the UE 102 is allowed use of a dedicated channel (or dedicated PRACH) to perform the random access. In previous solutions, the PRACH could be used for a variety of situations, such as for UEs that were handing over back to the WWAN 112, or for UEs that were performing other actions (i.e., not handover). In other words, the PRACH did not previously differentiate between the different actions being performed by the UEs. In previous solutions, the PRACH was not a dedicated PRACH exclusively used for WLAN-to-WWAN handover. The PRACH has a certain number of preambles available for use (e.g., 64 preambles or 128 preambles). The preambles can be certain codes (in a format of a preamble) that are used when the UE performs the random access. In previous solutions, only a subset of the available preambles could be used for UEs performing WLAN-to-WWAN handover. In other words, in previous solutions, the PRACH had to ensure that sufficient preambles were available for a variety of UE types, so therefore, not all of the available preambles could be used for UEs performing WLAN-to-WWAN handover. In the present technology, since the dedicated resource block in the physical channel is being used only for the WLAN-to-WWAN handover (i.e., a Wi-Fi specific PRACH), the number of available preambles is not limited to a subset, as in previous solutions. Therefore, the entire set of possible preambles for the WLAN-specific dedicated PRACH allocation are available to the UEs for performing non-contention based random access during the WLAN-to-WWAN handover.

In one example, the number of available preambles in the dedicated channel can exceed the number of UEs that are simultaneously attempting to reconnect with the WWAN 112. Therefore, each UE may not be assigned a unique preamble because the number of UEs exceeds the number of available preambles. Time division multiplexing (TDM) can be incorporated in order to reuse the same preamble among a group of offloaded UEs. For example, each UE in the group of UEs can use the same preamble to perform the random access, but each of the UEs can perform the random access at different subframes. In other words, TDM allows each of the UEs to be assigned a specific time frame or slot that is distinct from the other UEs in the group. As a result, UEs can share the same preamble, but still perform non-contention based random access. The multiple UEs can use the same preamble in a time domain to avoid collisions with each other.

In one example, using TDM can result in a tradeoff with respect to periodicity. The periodicity can refer to how often the UE 102 can use dedicated subframes to perform the random access. The UE 102 can utilize subframes in multiple frames when reverting back to operating over the WWAN 112. TDM can result in increased channel access delay for the UE 102. For example, without TDM, the UE 102 can freely perform the random access at desired subframes, but when TDM is implemented, the UE can only perform the random access during certain times (i.e., previously allocated subframes). For example, the UE 102 can perform random access at defined subframes every frame, every other frame, every third frame, etc. Although using TDM can increase the channel access delay, the use of TDM can avoid contention-based random access, which is unlike previous solutions. The periodicity at which the UE 102 can use the dedicated subframe to perform the random access can vary based on quality of service (QoS) requirements for the UE's offloaded data resource blocks (DRBs). Thus, the periodicity can be based on the UE's traffic level. As the internet protocol (IP) traffic grows, the periodicity of the dedicated resource allocations can be reduced (e.g., the UE 102 can perform random access at defined subframes every five frames as opposed to every two frames when the IP traffic is relatively large). The random access channel allocation can be allocated less frequently or more frequently for the UE 102 depending on the UE's traffic level.

With the enhancements described above, the number of UEs that can simultaneously use non-contention random access for WLAN-to-WWAN handover can be increased. The network can allocate one or more PRACH subframes dedicated for UEs that are offloaded to the Wi-Fi network, such that all PRACH preamble codes can be used for non-contention based random access or contention based random access. When the available PRACH preamble codes are not enough for the number of UEs that are connecting back to the WWAN, the eNB can assign the same PRACH preamble for multiple UEs and multiplex the multiple UEs in the time domain to avoid contentions. The periodicity (or cycle) of each TDM allocation can be based on the quality of service (QoS) requirement of the UE's active data radio bearers (DRBs). These enhancements improve previous solutions, in which the UE would be limited to performing contention based random access when handing over from the WLAN to the WWAN.

Figure 2:
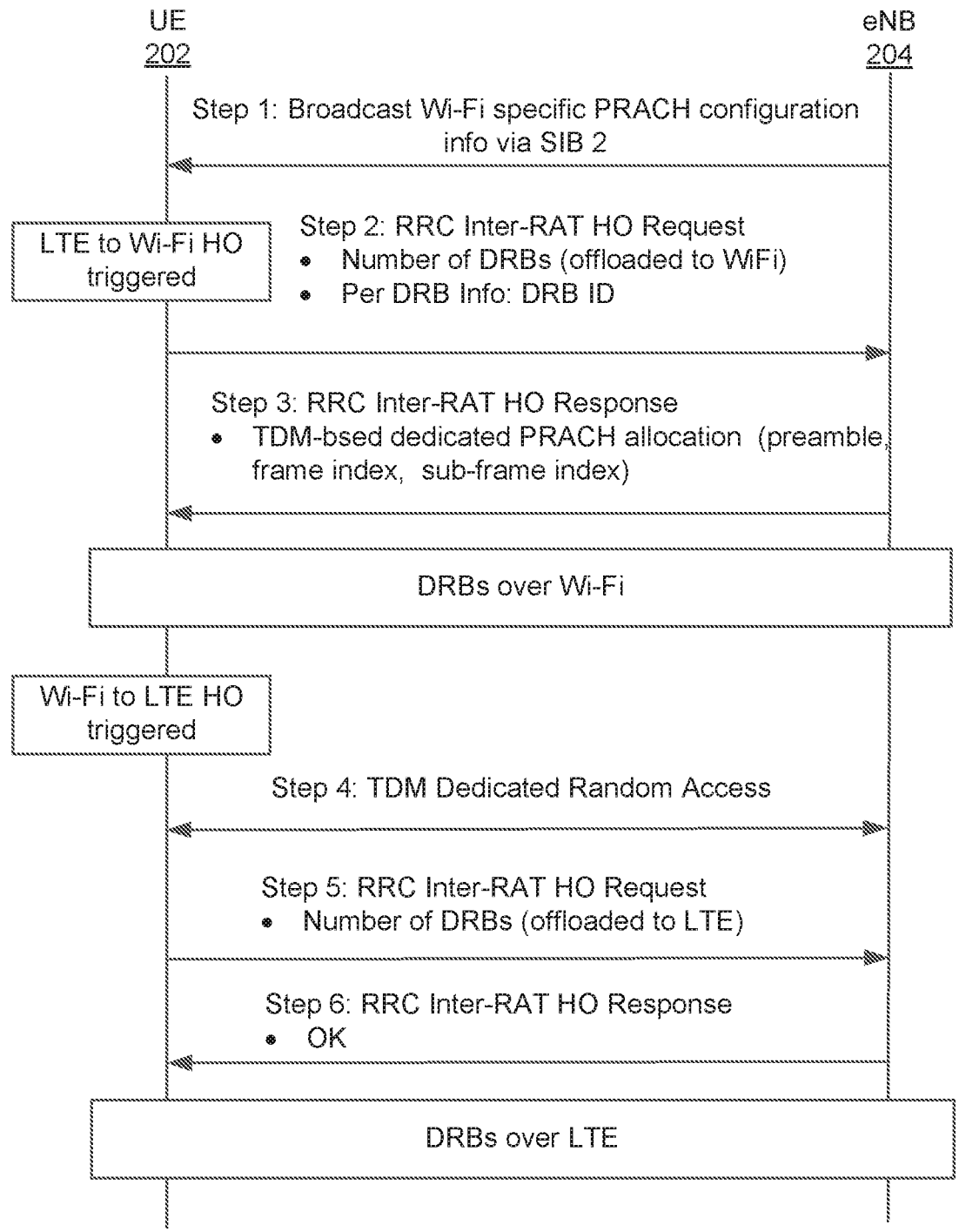
FIG. 2 illustrates signaling between a user equipment (UE) and an evolved node B (eNB) for inter-radio access technology (RAT) wireless local area network (WLAN) to wireless wide area network (WWAN) handover in accordance with an example.

FIG. 2 illustrates exemplary signaling between a user equipment (UE) 202 and an evolved node B (eNB) 204 for inter-radio access technology (RAT) wireless local area network (WLAN) to wireless wide area network (WWAN) handover. The UE 202 can initially begin operating over the WWAN. In one example, the WWAN can include Third Generation Partnership Project (3GPP) Long Term Evolution (LTE) Release 8, 9, 10, 11 or 12 networks. The UE 202 can be configured to operate using multiple radio access technologies (RATs), such as WLAN (or Wi-Fi) or WWAN.

In step 1, the eNB 204 can send Wi-Fi specific physical radio access channel (PRACH) configuration information to the UE 202. The PRACH configuration information can be WLAN-specific PRACH configuration information. The UE 202 can receive the PRACH configuration information when operating over the WWAN. The PRACH configuration information can aid the UE 202 to perform a WLAN-to-WWAN handover at a later time. For example, when the WLAN is affected by interference and the UE 202 switches back to the WWAN, the UE 202 can use the PRACH configuration information to perform the WLAN-to-WWAN handover. In one example, the PRACH configuration information can be broadcasted from the eNB 204 in a system information block type 2 (SIB2) message. The PRACH configuration information can notify the UE 202 of a location of the PRACH. The PRACH configuration information can indicate to the UE 202 where the WLAN-specific PRACH allocation is. In other words, the UE 202 can determine where to look for the PRACH upon receiving the PRACH configuration information from the eNB 204.

The PRACH configuration information can include, but is not limited to, a root sequence number for the WLAN-to-WWAN handover, a PRACH configuration index for the WLAN-to-WWAN handover, a high speed flag for the WLAN-to-WWAN handover, a zero correlation zone configuration for the WLAN-to-WWAN handover, and a PRACH frequency offset for the WLAN-to-WWAN handover. In other words, the root sequence number, the PRACH configuration index, the high speed flag, the zero correlation zone, and the PRACH frequency offset can be the PRACH configuration parameters for handing the UE 202 over from WiFi to the WWAN. These PRACH configuration parameters can be included in the SIB2 message that is broadcast to the UE 202 from the eNB 204.

In step 2, a WWAN to WLAN handover can be triggered at the UE 202. In other words, an LTE to WiFi handover can be triggered at the UE 202. In one example, when the UE 202 is operating over the WWAN, the handover to the WLAN can be triggered in order to reduce traffic at the eNB 204. When the handover to the WLAN is triggered, the UE 202 can send a handover request message to the eNB 204. The handover request message can indicate the UE's desire to switch to the WLAN. The handover request message can be an inter-RAT handover request, which indicates the UE's desire to hand over or switch from one RAT (e.g., LTE) to another RAT (e.g., WiFi). In one example, the handover request can be included in a radio resource control (RRC) message communicated from the UE 202 to the eNB 204. The handover request message can include a number of data resource blocks (DRBs) offloaded to a WiFi link. In addition, the handover request message can include per DRB information, such as DRB identifiers (IDs). In an alternative example, the eNB 204 can determine to initiate the WWAN to WLAN handover, rather than the UE 202.

In step 3, the eNB 204 can send a handover response message to the UE 202. The eNB 204 can send the handover response message in response to receiving the handover request message from the UE 202. The handover response can be an inter-RAT handover response. In addition, the handover response can be included in an RRC message communicated from the eNB 204 to the UE 202. The UE's DRBs can be handed over from the WWAN to the WLAN. In other words, the UE's DRBs can be handed over from the LTE network to the WiFi network, and the UE 202 can subsequently operate over the WiFi network.

In addition, the handover response message can include WLAN-specific dedicated physical random access channel (PRACH) allocation information, which can enable the UE 202 to perform the WLAN-to-WWAN handover at a later time. The dedicated PRACH information can be time division multiplexing (TDM)-based or code division multiplexing (CDM)-based, such that the UE 202 can initiate the WLAN-to-WWAN handover along with a plurality of other UEs that are also being handed back to the WWAN. The dedicated PRACH information can allow the UE 202 to perform WLAN-to-WWAM handover using TDM-based non-contention based random access. In other words, the eNB 204 can provide dedicated Wi-Fi specific PRACH allocation information to enable the UE 202 to perform TDM-based non-contention random access when WiFi to LTE handover is triggered later on.

The dedicated PRACH allocation information can include a PRACH preamble, a subframe index, and a frame index per cycle. The PRACH preamble can be a code used by the UE 202 to perform the non-contention random access. The PRACH preamble can be a unique preamble for the UE 202, or alternatively, the PRACH preamble can be shared among a group of UEs. The subframe index and the frame index can indicate a specified time slot during which the UE 202 can perform the non-contention based random access. This specified time slot can be assigned to a particular UE 202, and as a result, other UEs do not use the same specified time slot to perform random access as compared to the UE 202. In other words, the subframe index and frame index in the dedicated PRACH allocation information is specific to the UE 202. The subframe index and the frame index provide a unique time/location for the UE 202 to perform the random access. Thus, the random access is non-contention, i.e., the UE 202 does not contend for the same time slot as other UEs for performing the random access.

As non-limiting examples, the dedicated PRACH allocation information can indicate a subframe index as being a second subframe within a frame (i.e., a set of 10 subframes) and the frame index per cycle as being a third frame out of a four-frame cycle. In other words, the dedicated PRACH allocation information can assign the UE 202 to perform random access using a second subframe every four frames. During these designated time slots, no other UEs may perform random access, thus providing the UE 202 with non-contention random access. On the other hand, if the same PRACH preamble, the same frame, and the same subframe are provided to two separate UEs, then the two UEs will contend when they perform random access (i.e., because both UEs will attempt to perform random access at the same timeslot and using the same preamble).

The dedicated PRACH allocation can allow the UE 202 to perform the random access during a specified time slot that does not coincide with other UEs that are also performing random access. For example, these other UEs may also have been connected to the WLAN, and if the WLAN became inoperative, the other UEs can initiate the random access procedure at substantially the same time as the UE 202. The use of TDM can allow the multiple UEs that are switching back to the WWAN at the same time to still perform non-contention based random access (i.e., perform random access during a time slot does not coincide with another UE performing the random access). TDM essentially allows each of the UEs to take turns to perform the random access. As a non-limiting example, a first UE can use a first subframe within a frame, a second UE can use a second subframe within the frame, a third UE can use a sixth subframe within the frame, and so on. The first UE, the second UE and the third UE can each use their designated subframe every other frame to perform the random access. The specific timeslot for each UE can be predetermined, such that the timeslots do not overlap for multiple UEs. As a result, TDM can allow for the coordination of multiple UEs to perform random access without contention (using shared preambles or unique preambles). In one example, multiple UEs can share the same preamble when the number of UEs attempting to switch back to the WWAN is greater than the number of possible preambles for the dedicated PRACH.

The UE 202 can operate using the WLAN for a defined period of time. At some point, the UE can be triggered to switch back to the WWAN. In other words, WiFi to LTE handover can be triggered at the UE 202. In one example, the WiFi to LTE handover can be triggered when the WLAN suddenly experiences significant interference and is unable to handle the UEs that are connected to the WLAN.

In step 4, the UE 202 can perform a TDM-based dedicated random access with the eNB 204. The UE 202 can use the dedicated PRACH allocation information that was previously received (in the handover response message) in order to perform the random access with the eNB 204. In particular, the UE 202 can use the PRACH preamble, the frame index and the subframe index from the dedicated PRACH allocation information. Since a dedicated or separate PRACH (i.e., a WiFi specific PRACH) is allocated for the UE 202 to perform the WLAN-to-WWAN handover, a legacy PRACH will not be used.

Since the dedicated random access is TDM or CDM, the timeslot at which the UE 202 performs the dedicated random access can be coordinated with other UEs that are also performing random access, such that the UE's timeslot does not conflict with another UE's timeslot. In one example, the UE 202 can perform the dedicated random access using multiple subframes in consecutive frames. As a non-limiting example, the UE 202 can use a first subframe in a first frame, a first subframe in a third frame, and a first subframe in a fifth frame in order to complete the random access procedure. The UE 202 can use a PRACH preamble that is unique to the UE 202, or alternatively, the UE 202 can use a PRACH preamble that is shared with other UEs. However, since the UE 202 performs the dedicated random access at a unique timeslot (i.e., specific to the UE 202), using a shared PRACH preamble still allows for non-contention based random access.

If the eNB 204 does not provide a WiFi specific dedicated PRACH allocation to the UE 202, then the UE 202 can use a legacy contention-based random access procedure over a legacy PRACH (i.e., a PRACH that is not dedicated for WLAN-to-WWAN handovers). The legacy contention-based random access procedure (or legacy PRACH configuration) can be specified in a SIB2 message previously communicated from the eNB 204 to the UE 202.

In step 5, the UE 202 can send a handover request message to the eNB 204. The handover request message can indicate the UE's desire to switch back to the WWAN from the WLAN. The handover request message can be an inter-RAT handover request, which indicates the UE's desire to hand over or switch from one RAT (e.g., WiFi) to another RAT (e.g., LTE). In one example, the handover request can be included in a radio resource control (RRC) message communicated from the UE 202 to the eNB 204. The handover request message can include a number of data resource blocks (DRBs) offloaded to an LTE link. In addition, the handover request message can include per DRB information, such as DRB identifiers (IDs). In an alternative example, the eNB 204 can determine to initiate the WLAN to WWAN handover, rather than the UE 202.

In step 6, the eNB 204 can send a handover response message to the UE 202. The eNB 204 can send the handover response message in response to receiving the handover request message from the UE 202. The handover response can be an inter-RAT handover response. In addition, the handover response can be included in an RRC message communicated from the eNB 204 to the UE 202. The UE's DRBs can be handed over from the WLAN to the WWAN. In other words, the UE's DRBs can be handed over from the WiFi network back to the LTE network, and the UE 202 can subsequently operate over the LTE network.

FIGS. 3A-3C illustrate exemplary physical random access channel (PRACH) configuration information in a system information block type 2 (SIB2) message for wireless local area network (WLAN) to wireless wide area network (WWAN) handover. The WWAN can include a Third Generation Partnership Project (3GPP) Long Term Evolution (LTE) network. The PRACH configuration information can be broadcasted to a user equipment (UE) from an evolved node B (eNB). As previously described, the PRACH configuration information can be WiFi specific. In other words, the PRACH configuration information can allow the UE to perform the WLAN-to-WWAN handover (e.g., when the WLAN fails and the UE that was connected to the WLAN has to switch back to the WWAN).

As shown in FIGS. 3A-3C, the SIB2 message that is broadcasted to the UE can include a root sequence number for a WLAN-to-LTE handover, a PRACH configuration index for the WLAN-to-LTE handover, a high speed flag for the WLAN-to-LTE handover, a zero correlation zone configuration for the WLAN-to-LTE handover, and a PRACH frequency offset for the WLAN-to-LTE handover. As non-limiting examples, the root sequence number can be set to 30, the PRACH configuration index can be set to 12, the zero correlation zone configuration can be set to 8, the high speed flag can be set to false, and the PRACH frequency offset can be set to 3.

Figure 4A:
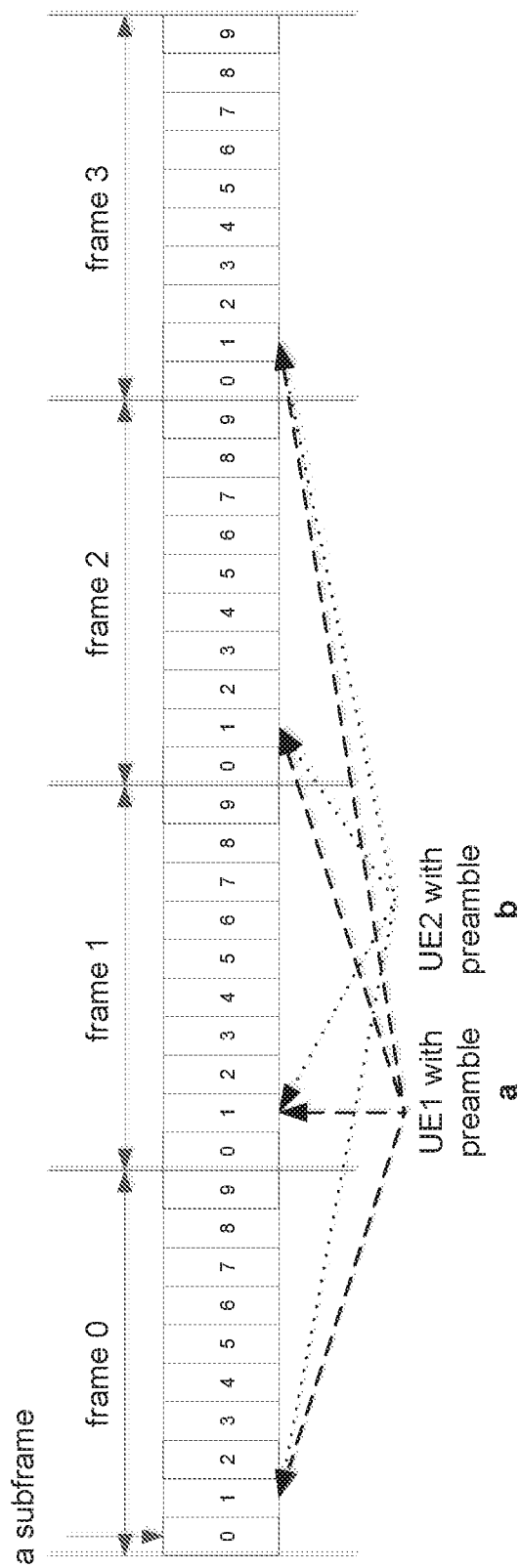
FIG. 4A illustrates a legacy contention-based random access procedure in order to switch from a wireless local area network (WLAN) to a wireless wide area network (WWAN) in accordance with an example.

FIG. 4A illustrates a legacy contention-based random access procedure in order to switch from a wireless local area network (WLAN) to a wireless wide area network (WWAN). In the example shown in FIG. 4A, a PRACH configuration index can be set to three. The PRACH configuration index can be further explained in 3GPP Technical Specification (TS) 36.211 Release 12.3 Table 5.7.1-2. A first UE can perform random access using preamble A and a second UE can perform random access using preamble B. The first UE can perform the random access during a second subframe (i.e., subframe 1) of frame 0, a second subframe of frame 1, a second subframe of frame 2, and a second subframe of frame 3. Similarly, a second UE can perform the random access during the second subframe (i.e., subframe 1) of frame 0, the second subframe of frame 1, the second subframe of frame 2, and the second subframe of frame 3. Thus, the UEs can each use subframe 1 in every frame to access the PRACH. Since both the first UE and the second UE perform the random access during the same subframes and same frames, the random access is contention-based. Although the UEs each use separate preambles, the overlap between the subframes can result in contention-based random access. Contention-based random access can be inefficient and cause relatively long WLAN-to-WWAN handover latency.

Figure 4B:
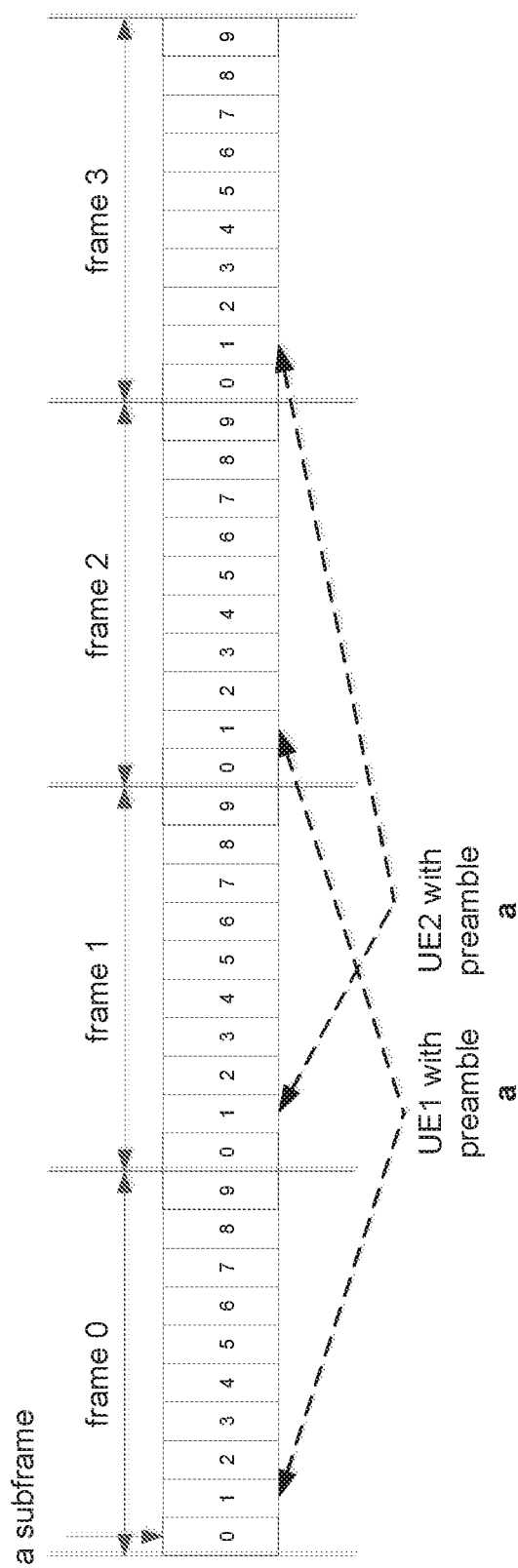
FIG. 4B illustrates a random access procedure using time division multiplexing (TDM)-based dedicated physical random access channel (PRACH) allocation information in accordance with an example.

FIG. 4B illustrates a random access procedure using time division multiplexing (TDM)-based dedicated physical random access channel (PRACH) allocation information. In other words, non-contention based random access can be performed using WLAN-specific dedicated PRACH allocation information. In the example shown in FIG. 4A, a PRACH configuration index can be set to three. The PRACH configuration index can be further explained in 3GPP Technical Specification (TS) 36.211 Release 12.3 Table 5.7.1-2. A first UE can perform random access using preamble A and a second UE can also perform random access using preamble A. The first UE can perform the random access during a second subframe (i.e., subframe 1) of frame 0 and a second subframe of frame 2. On the other hand, a second UE can perform the random access during the second subframe (i.e., subframe 1) of frame 1 and a second subframe of frame 3. The first UE can use subframe 1 in frame 2n (n=0, 1, 2, 3, 4, and so on) and the second UE can use subframe 1 in frame 2n+1 (n=0, 1, 2, 3, 4, and so on). The periodicity at which the UEs perform the dedicated random access can be every frame, every other frame, every third frame, etc. depending on the number of UEs that are simultaneously performing the random access. For example, if three separate UEs are sharing the same preamble, then each UE can perform random access every third frame. Although the UEs in this example use the same preamble to perform the random access, the UEs can also use separate or unique subframes to access the PRACH. Therefore, the random access is non-contention based.

By implementing time division multiplexing (TDM) for the random access, the first UE and the second UE can perform the random access using designated subframes/frames that do not overlap with each other. In addition, the contention-free technique described herein can allow the TDM-based reuse of the same preamble, such that the number of UEs adopted is expanded to M times if the TDM cycle is M frames, wherein M is an integer. For example, an $i^{th}$ UE can use subframe 1 in frame Mn+I, where n=0, 1, 2, 3, 4, and so on. As a non-limiting example, if M=5, then five UEs can use the same preamble to perform the random access. In this example, one of the UEs can perform the random access at a designed frame, and then not perform random access again for another five frames (since M=5). This scaling factor allows a greater number of UEs to be supported as compared to the available preambles for the dedicated PRACH.

Figure 5:
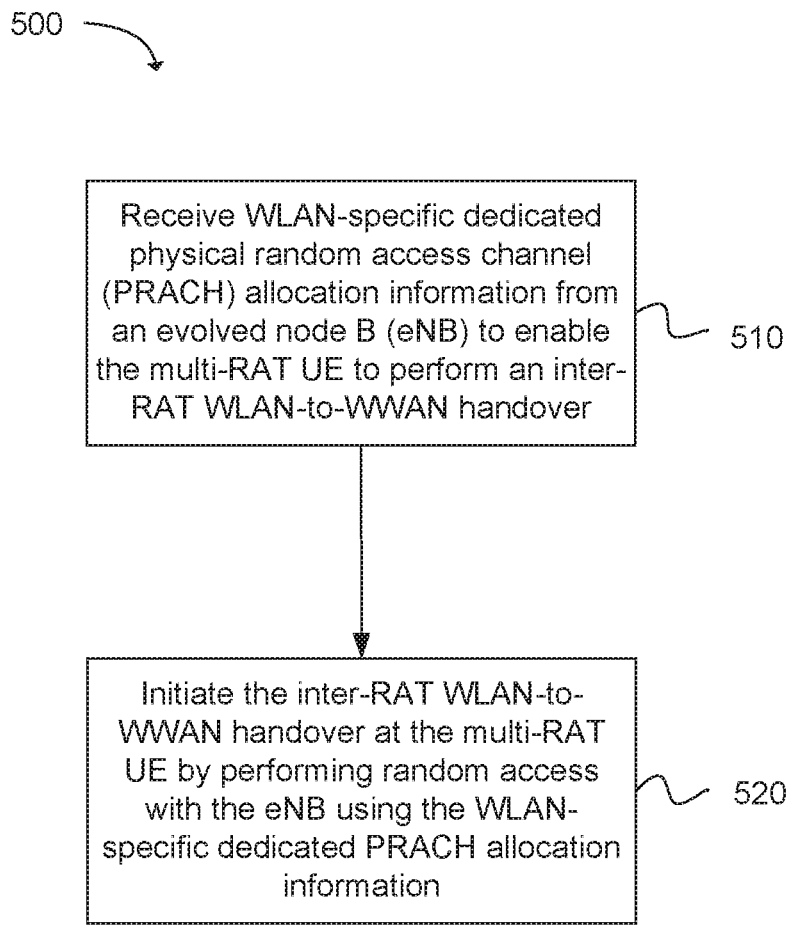
FIG. 5 depicts functionality of a multi-radio access technology (multi-RAT) user equipment (UE) operable to switch from a wireless local area network (WLAN) to a wireless wide area network (WWAN) in accordance with an example.

Another example provides functionality 500 of a multi-radio access technology (multi-RAT) user equipment (UE) operable to switch from a wireless local area network (WLAN) to a wireless wide area network (WWAN), as shown in the flow chart in FIG. 5. The functionality can be implemented as a method or the functionality can be executed as instructions on a machine, where the instructions are included on at least one computer readable medium or one non-transitory machine readable storage medium. The multi-RAT UE can include one or more processors configured to receive WLAN-specific dedicated physical random access channel (PRACH) allocation information from an evolved node B (eNB) to enable the multi-RAT UE to perform an inter-RAT WLAN-to-WWAN handover, as in block 510. The multi-RAT UE can include one or more processors configured to initiate the inter-RAT WLAN-to-WWAN handover at the multi-RAT UE by performing random access with the eNB using the WLAN-specific dedicated PRACH allocation information, as in block 520.

In one example, the one or more processors can be further configured to perform non-contention based random access or contention-based random access with the eNB using the WLAN-specific dedicated PRACH allocation information. In another example, the WLAN-specific dedicated PRACH allocation information includes a time division multiplexing (TDM)-based dedicated PRACH allocation to enable a plurality of multi-RAT UEs to each initiate an inter-RAT WLAN-to-WWAN handover. In yet another example, the WWAN network includes a Third Generation Partnership Project (3GPP) Long Term Evolution (LTE) Release 8, 9, 10, 11 or 12 network.

In one example, the one or more processors can be further configured to initiate the inter-RAT WLAN-to-WWAM handover by performing at least one of time division multiplexing (TDM) or code division multiplexing (CDM) random access using the WLAN-specific dedicated PRACH allocation information. In another example, the one or more processors can be further configured to receive WLAN-specific PRACH configuration information that is broadcast from the eNB via a system information block type 2 (SIB2) message, the WLAN-specific PRACH configuration information to be used for performing the inter-RAT WLAN-to-WWAN handover for the multi-RAT UE. In yet another example, the WLAN-specific PRACH configuration information includes a root sequence number for the WLAN-to-LTE handover, a PRACH configuration index for the WLAN-to-LTE handover, a high speed flag for the WLAN-to-LTE handover, a zero correlation zone configuration for the WLAN-to-LTE handover, and a PRACH frequency offset for the WLAN-to-LTE handover.

In one configuration, the one or more processors can be further configured to receive the WLAN-specific dedicated PRACH allocation information from the eNB in response to sending a handover request message to the eNB, the handover request message for switching the multi-RAT UE from operating over the WWAN to operating over the WLAN. In another configuration, the one or more processors can be further configured to receive the WLAN-specific dedicated PRACH allocation information in a handover response message, the multi-RAT UE being configured to switch to operating over the WLAN upon receiving the handover response message from the eNB.

In one example, the one or more processors are further configured to initiate the WLAN-to-WWAN handover at the multi-RAT UE by performing at least one of time division multiplexing (TDM) or code division multiplexing (CDM) random access using a PRACH preamble included in the WLAN-specific dedicated PRACH allocation information, a subframe index included in the WLAN-specific dedicated PRACH allocation information, and a frame index per cycle included in the WLAN-specific dedicated PRACH allocation information. In another example, the PRACH preamble is a unique preamble for the UE or is a preamble shared among a group of UEs. In yet another example, the WLAN-to-WWAN handover at the UE occurs in an integrated WLAN and WWAN network.

Figure 6:
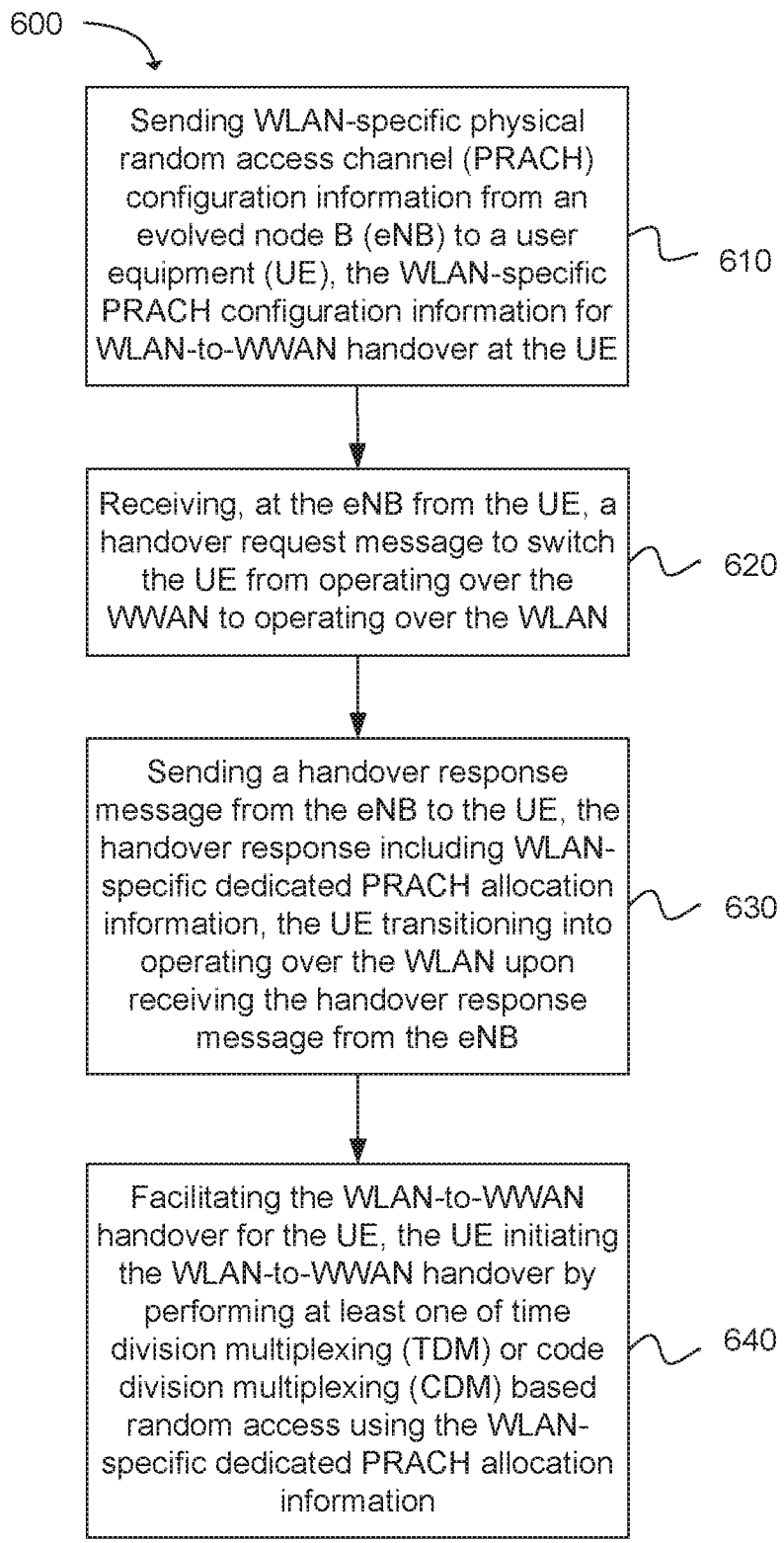
FIG. 6 depicts a flowchart of a method for facilitating wireless local area network (WLAN) to wireless wide area network (WWAN) handover in accordance with an example.

Another example provides a method 600 for facilitating wireless local area network (WLAN) to wireless wide area network (WWAN) handover, as shown in the flow chart in FIG. 6. The method can be executed as instructions on a machine, where the instructions are included on at least one computer readable medium or one non-transitory machine readable storage medium. The method can include the operation of sending WLAN-specific physical random access channel (PRACH) configuration information from an evolved node B (eNB) to a user equipment (UE), the WLAN-specific PRACH configuration information for WLAN-to-WWAN handover at the UE, as in block 610. The method can include the operation of receiving, at the eNB from the UE, a handover request message to switch the UE from operating over the WWAN to operating over the WLAN, as in block 620. The method can include the operation of sending a handover response message from the eNB to the UE, the handover response including WLAN-specific dedicated PRACH allocation information, the UE transitioning into operating over the WLAN upon receiving the handover response message from the eNB, as in block 630. The method can include the operation of facilitating the WLAN-to-WWAN handover for the UE, the UE initiating the WLAN-to-WWAN handover by performing at least one of time division multiplexing (TDM) or code division multiplexing (CDM) based random access using the WLAN-specific dedicated PRACH allocation information, as in block 640.

In one example, the method can include the operation of sending the WLAN-specific PRACH configuration information via a system information block 2 (SIB2) message that is broadcast to the UE. In another example, the WLAN-to-WWAN handover is triggered at the UE in response to WLAN interference that exceeds a defined threshold. In yet another example, the WLAN-specific PRACH configuration information includes a root sequence number for the WLAN-to-LTE handover, a PRACH configuration index for the WLAN-to-LTE handover, a high speed flag for the WLAN-to-LTE handover, a zero correlation zone configuration for the WLAN-to-LTE handover, and a PRACH frequency offset for the WLAN-to-LTE handover.

In one example, the WLAN-specific dedicated PRACH allocation information sent to the UE includes a PRACH preamble, a subframe index and a frame index per cycle. In another example, the handover request message received from the UE to switch from WWAN to WLAN includes a number of data resource blocks (DRBs) offloaded to a WLAN link and associated DRB identifiers (IDs). In yet another example, the method can include the operation of receiving an additional handover request message from the UE to switch from WLAN to WWAN, the additional handover request message including a number of data resource blocks (DRBs) offloaded to a WWAN link and associated DRB identifiers (IDs).

Figure 7:
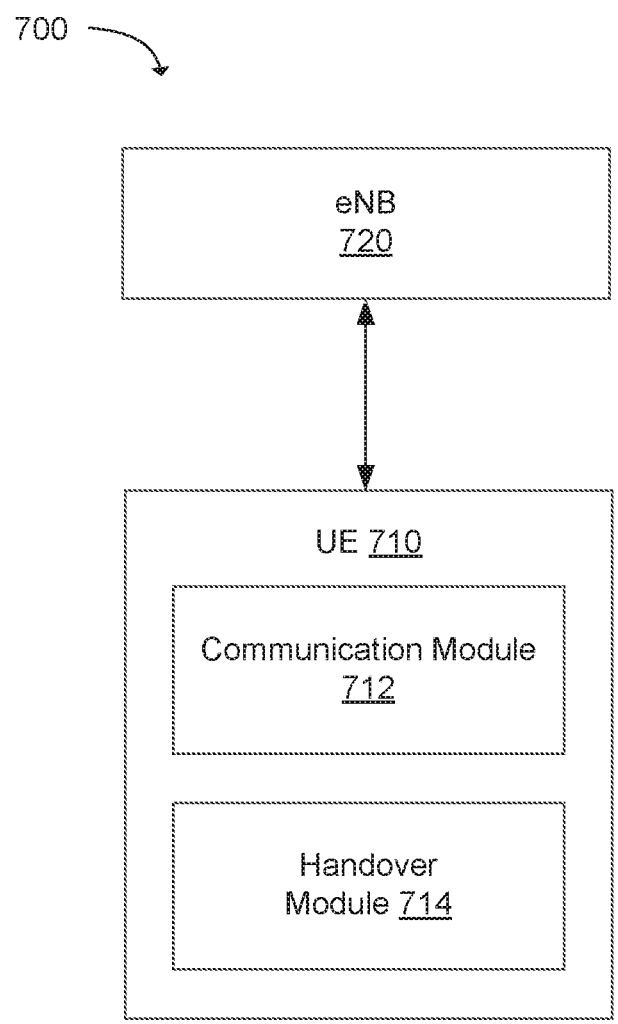
FIG. 7 depicts functionality of a user equipment (UE) operable to switch from a wireless local area network (WLAN) to a wireless wide area network (WWAN) in accordance with an example.

Another example provides functionality 700 of a user equipment (UE) 710 operable to switch from a wireless local area network (WLAN) to a wireless wide area network (WWAN), as shown in FIG. 7. The UE 710 can include a communication module 712 configured to receive time division multiplexing (TDM)-based WLAN-specific dedicated physical random access channel (PRACH) allocation information from an evolved node B (eNB) 720 to enable the UE 710 to perform the WLAN-to-WWAN handover. The UE 710 can include a handover module 714 configured to initiate the WLAN-to-WWAN handover at the UE 710 by performing TDM-based non-contention based random access with the eNB 720 using the WLAN-specific dedicated PRACH allocation information.

In one example, the WWAN network includes a Third Generation Partnership Project (3GPP) Long Term Evolution (LTE) Release 8, 9, 10, 11 or 12 network. In another example, the communication module 712 can be further configured to receive WLAN-specific PRACH configuration information that is broadcast from the eNB 720 via a system information block type 2 (SIB2) message, wherein the WLAN-specific PRACH configuration information can be used for performing the WLAN-to-WWAN handover at the UE 710.

In one example, the communication module 712 can be further configured to receive the TDM-based WLAN-specific dedicated PRACH allocation information from the eNB 720 in response to sending a handover request message to the eNB 720, wherein the handover request message can be for switching the UE 710 from operating over the WWAN to operating over the WLAN. In addition, the handover module 714 can be further configured to initiate the WLAN-to-WWAN handover at the UE 710 by performing time division multiplexing (TDM) non-contention based random access using a PRACH preamble included in the WLAN-specific dedicated PRACH allocation information, a subframe index included in the WLAN-specific dedicated PRACH allocation information, and a frame index per cycle included in the WLAN-specific dedicated PRACH allocation information.

Figure 8:
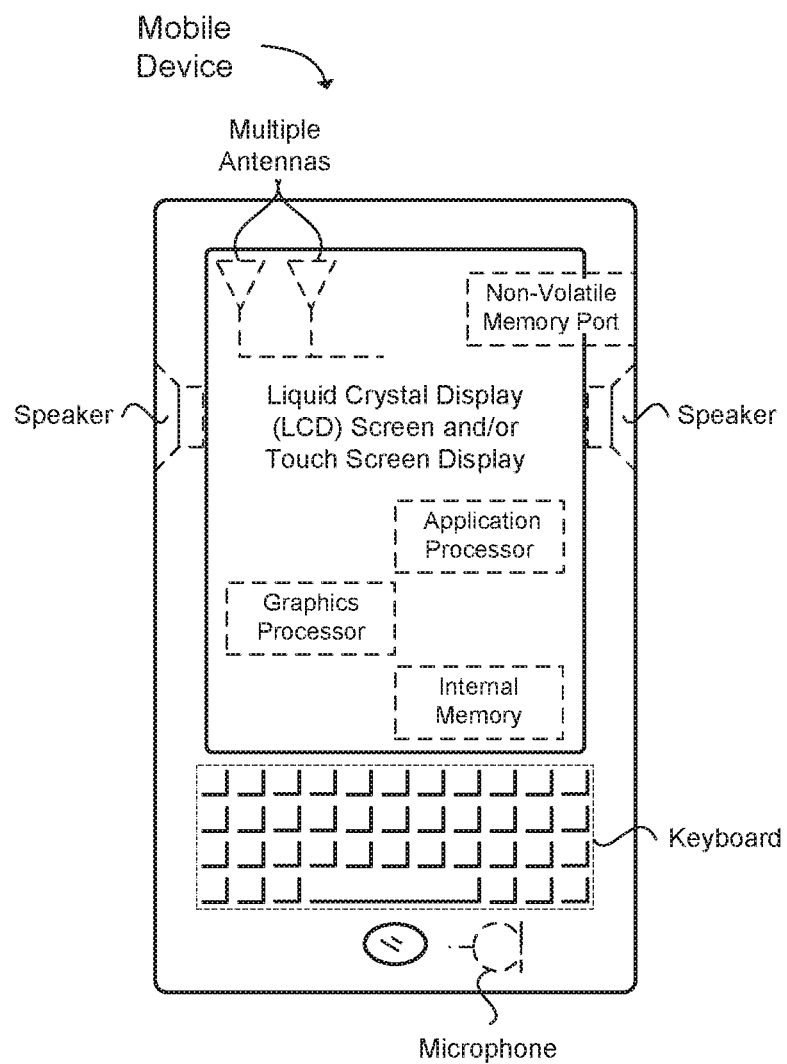
FIG. 8 illustrates a diagram of a wireless device (e.g., UE) in accordance with an example.

FIG. 8 provides an example illustration of the wireless device, such as an user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 8 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, CD-ROMs, hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a RAM, EPROM, flash drive, optical drive, magnetic hard drive, solid state drive, or other medium for storing electronic data. The node and wireless device can also include a transceiver module, a counter module, a processing module, and/or a clock module or timer module. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

It should be understood that many of the functional units described in this specification have been labeled as modules, in order to more particularly emphasize their implementation independence. For example, a module can be implemented as a hardware circuit comprising custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits can be used to implement the functional units described in this specification. For example, a first hardware circuit can be used to perform processing operations and a second hardware circuit (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" means that a particular feature, structure, or characteristic described in connection with the example is included in at least one embodiment of the present invention. Thus, appearances of the phrases "in an example" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a user equipment (UE) configured for handover from a wireless local area network (WLAN) to a base station, the apparatus comprising:
one or more processors configured to:
decode, at the UE, a handover message that includes a dedicated WLAN-to-base station random access channel (RACH) configuration received from the base station, wherein decoding the handover message includes decoding the dedicated WLAN-to-base station RACH configuration, the dedicated WLAN-to-base station RACH being specifically dedicated and configured for WLAN-to-base station handovers, wherein the dedicated WLAN-to-base station RACH configuration includes:
a dedicated RACH preamble; and
an indication of resources for handover of the UE from the WLAN to the base station, wherein the indication of resources includes time information and frequency information; and
perform, at the UE, the handover of the UE from the WLAN to the base station using the dedicated WLAN-to-base station RACH configuration that includes the dedicated RACH preamble and the indication of resources for the handover of the UE to the base station; and
memory configured to store the dedicated WLAN-to-base station RACH configuration.

2. The apparatus of claim 1, further comprising a transceiver configured to receive the dedicated WLAN-to-base station RACH configuration from the base station.

3. The apparatus of claim 1, wherein the one or more processors are further configured to perform non-contention based random access with the base station using the dedicated WLAN-to-base station RACH configuration received from the base station.

4. The apparatus of claim 1, wherein the indication of resources for the handover in the dedicated WLAN-to-base station RACH configuration that includes the time information includes a frame and a subframe to be used for the handover of the UE to the base station.

5. The apparatus of claim 1, wherein the one or more processors are further configured to:
decode a second RACH configuration received at the UE; and
use the dedicated WLAN-to-base station RACH configuration and the second RACH configuration for handover of the UE to the base station.

6. An apparatus of a base station configured to initiate a handover from a wireless local area network (WLAN) with a user equipment (UE), the apparatus comprising:
one or more processors configured to:
encode, at the base station, a handover message that includes a dedicated WLAN-to-base station random access channel (RACH) configuration for transmission to the UE, wherein encoding the handover message includes encoding the dedicated WLAN-to-base station RACH configuration, the dedicated WLAN-to-base station RACH being specifically dedicated and configured for WLAN-to-base station handovers, wherein the dedicated WLAN-to-base station RACH configuration includes:
a dedicated RACH preamble; and
an indication of resources for handover of the UE from the WLAN to the base station, wherein the indication of resources includes time information and frequency information; and
perform, at the base station, the handover of the UE from the WLAN to the base station using the dedicated WLAN-to-base station RACH configuration that includes the dedicated RACH preamble and the indication of resources for the handover of the UE to the base station; and
memory configured to retrieve the dedicated WLAN-to-base station RACH configuration.

7. The apparatus of claim 6, further comprising a transceiver configured to transmit the dedicated WLAN-to-base station RACH configuration to the UE.

8. The apparatus of claim 6, wherein the one or more processors are further configured to perform non-contention based random access with the UE based on the dedicated WLAN-to-base station RACH configuration.

9. The apparatus of claim 6, wherein the one or more processors are further configured to perform contention based random access with the UE based on the dedicated WLAN-to-base station RACH configuration.

10. The apparatus of claim 6, wherein the indication of resources for the handover in the dedicated WLAN-to-base station RACH configuration that includes the time information includes a frame and a subframe to be used for the handover of the UE to the base station.

11. The apparatus of claim 6, wherein the one or more processors are further configured to perform the handover of the UE to the base station using the dedicated WLAN-to-base station RACH configuration and a RACH configuration that is received at the UE via a broadcast.

12. At least one non-transitory machine readable storage medium having instructions embodied thereon for performing a handover of a user equipment (UE) from a wireless local area network (WLAN) to a base station, the instructions when executed by one or more processors cause the UE to perform the following:
decoding, at the UE, a handover message that includes a dedicated WLAN-to-base station random access channel (RACH) configuration received from the base station, wherein decoding the handover message includes decoding the dedicated WLAN-to-base station RACH configuration, the dedicated WLAN-to-base station RACH being specifically dedicated and configured for WLAN-to-base station handovers, wherein the dedicated WLAN-to-base station RACH configuration includes:
a dedicated RACH preamble; and
an indication of resources for handover of the UE from the WLAN to the base station, wherein the indication of resources includes time information and frequency information; and
initiating, at the UE, the handover of the UE from the WLAN to the base station using the dedicated WLAN-to-base station RACH configuration that includes the dedicated RACH preamble and the indication of resources for the handover of the UE to the base station.

13. The at least one non-transitory machine readable storage medium of claim 12, further comprising instructions which when executed by the one or more processors cause the UE to perform the following:
performing non-contention based random access with the base station using the dedicated WLAN-to-base station RACH configuration received from the base station.

14. The at least one non-transitory machine readable storage medium of claim 12, further comprising instructions which when executed by the one or more processors cause the UE to perform the following:
performing contention based random access with the base station using the dedicated WLAN-to-base station RACH configuration received from the base station.

15. The at least one non-transitory machine readable storage medium of claim 12, wherein the indication of resources for the handover in the dedicated WLAN-to-base station RACH configuration that includes the time information includes a frame and a subframe to be used for the handover of the UE to the base station.

16. The at least one non-transitory machine readable storage medium of claim 12, wherein the indication of resources for the handover in the dedicated WLAN-to-base station RACH configuration that includes the frequency information includes a RACH frequency offset to be used for the handover of the UE to the base station.

17. The at least one non-transitory machine readable storage medium of claim 12, further comprising instructions which when executed by the one or more processors cause the UE to perform the following:
decoding a RACH configuration received at the UE via a broadcast; and
using the RACH configuration and the dedicated RACH configuration for handover of the UE to the base station.

* * * * *